E. DE H. CALDWELL.
DIFFERENTIAL GEAR.
APPLICATION FILED MAY 20, 1918.

1,399,002.

Patented Dec. 6, 1921.

Witnesses

Inventor
Edwin DeHaven Caldwell
By his Attorney

UNITED STATES PATENT OFFICE.

EDWIN DE HAVEN CALDWELL, OF DUNKIRK, NEW YORK.

DIFFERENTIAL GEAR.

1,399,002.  Specification of Letters Patent.  Patented Dec. 6, 1921.

Original application filed July 14, 1917, Serial No. 180,523. Divided and this application filed May 20, 1918. Serial No. 235,434.

*To all whom it may concern:*

Be it known that I, EDWIN DE HAVEN CALDWELL, a citizen of the United States, residing in the town of Dunkirk and county of Chautauqua, State of New York, have invented certain new and useful Improvements in Differential Gears, of which the following is a specification, reference being had to the accompanying drawings, illustrative of one particular embodiment of my invention.

This invention relates to devices known as differential gears or balance gears, such as are used in the transmission of power to a divided shaft when it is desired that the two parts shall turn at the same or different speeds under varying conditions.

More especially the invention relates to such devices as are used in connection with the driving axle of vehicles where the device well known has a differential gear, transmits the power from the driving shaft to the driven shaft or axle, the latter being made in two parts and adjacent ends being driven in a manner permitting their rotation at different speeds or the same speed, so that when turning corners the wheels of the vehicle may each roll at the proper speed while the power is transmitted to them equally. In this construction of differential, the aim of this invention is to provide means whereby the power will be transmitted to one wheel in case the opposite wheel loses traction or purchase on the ground, and to accomplish this object automatically.

The particular embodiments of my invention herein shown and described, are specific forms of my invention set forth in my pending application for United States Letters Patent, Serial No. 180,523, filed July 14, 1917, entitled "Differential gears," of which this application is a division; and the specific forms to which this application relates are shown in embodiments in the accompanying drawings, in which—

Figure 1:
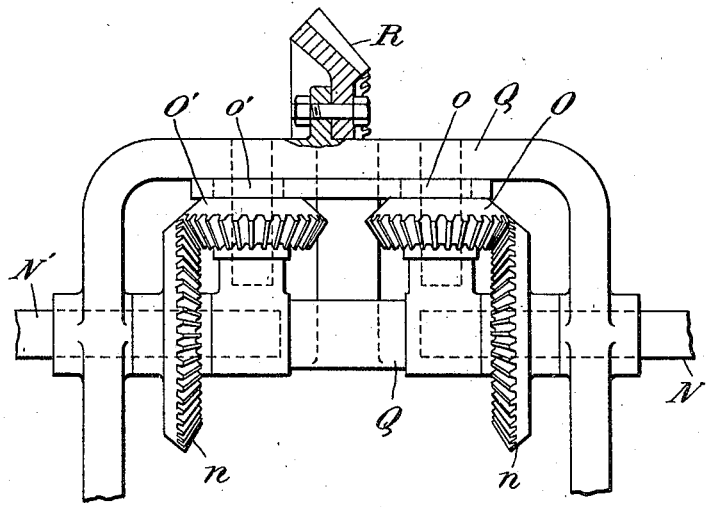
Figure 1 is a plan view of a bevel gear differential.
Figure 2:
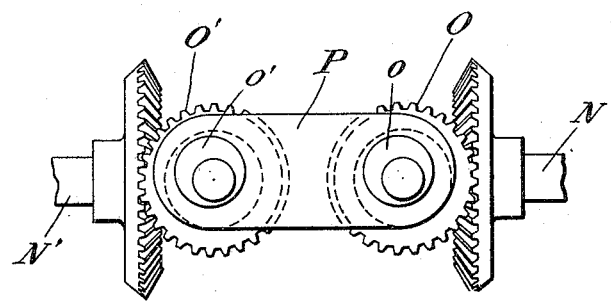
Fig. 2 is an elevation of the balance gear parts of Fig. 1, assembled with frame and driving gear.

In the form shown in Figs. 1 and 2, the general elements of a bevel gear differential are shown, but without regard to exact dimensions, such as the eccentricity or other features. In this embodiment the two driven shaft parts N—N' have gears n—n' keyed or splined thereto, each engaging, respectively, bevel pinions O—O'. In the ordinary differential these bevel pinions O—O' would be one and the same instead of two, and would accommodate freely any relative movement in opposite directions of the axle gears N—N'. By separating the bevel pinions into two, and making them two complete gears, I add a means of controlling the rotation of the two gears under unusual conditions. That is, by the plate P with a bearing at either end engaging the eccentric hub portions o—o' of the gears O—O', like rotary movement is permitted of the gears O—O' in unison. If, however, the resistance to rotation on either one of the gears is materially greater, that is the relative resistance materially greater, or a sudden impulse on one, the eccentric link connection between the bevel pinion hubs would have to drive the other bevel pinion. However, whether differential action will ensue depends whether there is sufficient power transmitted by the link from the one pinion to the other, and on account of the eccentricity it would mean the power would have to be sufficient at the very small relative radius to overcome a larger resistance. Before the force transmitted through the link is sufficient to cause this transmission of power, the force of the driving system of the car has exceeded the power necessary to turn the driving wheel still having traction, or, in other words, the power has been sufficient to propel the vehicle before it reaches the critical point of transmitting motion from one of the pinions to the other. Thus automatically in those unusual cases when differential action is not wanted, my differential box will not function,—but as soon as a substantial balance of resistance is restored as in straight running of a car with both wheels having substantially equal traction, the balance is such that the differential will function.

Thus action of one of the bevel gears having an eccentric associated portion engaging an interconnecting element of the differential in which it is eccentrically mounted, will cause a locking of the interconnected element of the differential, when there is a substantial disturbance of the balance of resistance between both sides of the differential. It will be noted that in the embodiments shown, one form involves the application of the eccentric locking elements in connection with the mounting of the pinions of the differential, while in the other form the eccentric mounting is on one of the differential gear rings.

Various modifications may be made with respect to the arrangement of parts and dimensions to effect the results aimed at in my invention, and the construction may be simplified for the purpose of its application to various designs, but in this application the embodiment of my invention in bevel gear transmissions is shown, although in principle it may be otherwise used.

What I claim and desire to secure by Letters Patent is:

A differential gearing having relatively rotatable coaxial gears, a frame rotatable about the axis of said gears, pinions, journaled on the frame and engaged with said gears, eccentrics rotatable with said pinions, and a link having bearings engaging said eccentrics.

In testimony whereof, I have signed my name to this specification, in the presence of two subscribing witnesses, this 16th day of May, 1918.

EDWIN de HAVEN CALDWELL.

Witnesses:
O. F. HAKES,
HERMANN F. CUNTZ.